Sept. 8, 1959   M. B. LEVOY   2,903,125
EYEGLASS CASE
Filed June 20, 1958

INVENTOR.
Monroe B. Levoy,

_2,903,125_
_Patented Sept. 8, 1959_

2,903,125

EYEGLASS CASE

Monroe Benjamin Levoy, Great Neck, N.Y., assignor to Optical Salons Ltd., Great Neck, N.Y., a corporation of Delaware Application June 20, 1958, Serial No. 743,345

3 Claims. (Cl. 206—5)

This invention relates to an eyeglass case and more particularly to a case which combines with the ordinary function of carrying and protecting eyeglasses the further function of automatically polishing the lenses of the eyeglasses.

The eyeglass case of the present invention is primarily intended to receive and protect eyeglasses of a novel form, which, in addition to the usual lens carrying, nose engaging bridge and conventional ear engaging temples, also comprises an ornamental tiara constituting strip, hereinafter described.

The manner in which the device of the invention coacts with eyeglasses of the character described, will be best understood by reference to the accompanying drawing wherein.

Like numerals designate corresponding parts throughout the several views.

Figure 1:
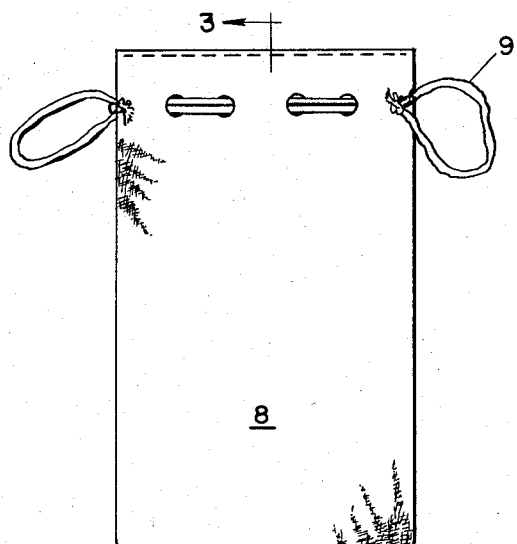
Fig. 1 is a front elevation of a preferably bag-like case constructed in accordance with the invention.
Figure 2:
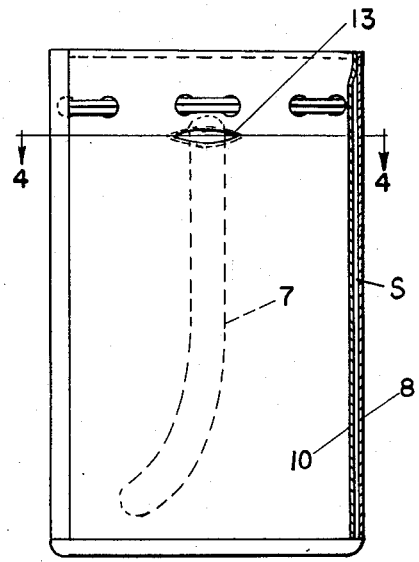
Fig. 2 is a vertical transverse sectional view.
Figure 3:
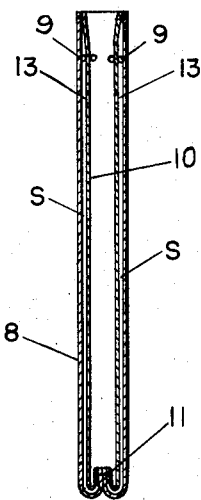
Fig. 3 is a front to back sectional view on line 3—3 of Fig. 1.
Figure 4:
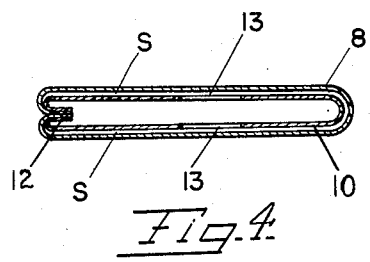
Fig. 4 is a horizontal section on line 4—4 of Fig. 2.
Figure 5:
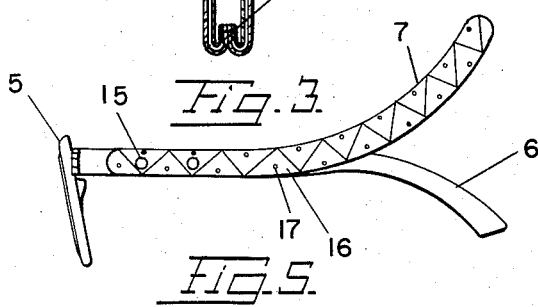
Fig. 5 is a view, upon a reduced scale, illustrating a pair of eyeglasses of the type that is adapted to be housed in and polished by the improved bag-like case of the invention.

In the drawings, 5 designates the conventional lens carrying bridge and 6 one of the ear engaging temples of a pair of eyeglasses.

A novel type of eyeglass which has achieved widespread popularity adds to the conventional elements 5 and 6 ornamental, tiara forming strips 7. These strips at their forward and lower ends lie in substantial parallelism with and close to the temples 6, only one of which is shown. The rear ends of tiara strips 7 curve upwardly to engage in the hair of feminine wearers where they serve to create a pleasing and ornamental tiara effect.

These strips, at first adopted for their ornamental effect, have been found to have a high degree of utility in aiding to anchor the eyeglasses against shifting. This effect is largely achieved by the departure of the rear ends of strips 7 away from the rear ends of temples 6, thus giving a wide base of head engagement and anchorage at the rear ends of these elements.

However, the achievement of both the tiara forming effect and the better anchorage has resulted, where the strips 7 were rigidly affixed to the temples 6, in yielding a structure which could not be contained within eyeglass cases of conventional form except by making such cases unduly large and cumbersome.

Therefore, it has been proposed to make the strips 7 readily separable from the temples 6. This provides several advantages in that it permits the eyeglasses to be worn without the tiara effect during business hours if desired; it makes it possible to readily substitute different designs of tiaras for use with a single pair of glasses and finally it permits the strip 7, when detached, to be disposed in almost complete alignment with the temples 6 whereby to facilitate the placing of the whole assembly in a container or case of a reasonable size and wherein the lenses will be protected from contact with and scratching by the strips 7.

The idea of making the strips 7 readily detachable from the eyeglasses proper constitutes a separate invention that is being made the subject of a separate application Serial No. 743,344, filed on the 20th day of June, 1958, the present application being devoted to the container or case for the described assembly.

The case of the invention comprises an outer bag-like body 8 of a preferably flexible material, the mouth of which may be closed by a conventional draw string 9. Body 8 may be of a thin relatively flexible leather, or so-called artificial leather, or any suitable one of the plastics or fabrics such as are so widely used in the manufacture of women's hand bags, purses and the like. The method of forming the bag may be varied within the judgment of the seamstress. In the form shown an inner lining 10 is stitched to bag 8 along the top edge of the bag. At the bottom and along one vertical edge of the case the materials of the case and lining are turned over and stitched to form bottom seam 11 and side seam 12. This completes the open top bag forming the case. Slits 13 are formed in the lining and the edges of these slit portions may be whipped or bound to prevent the material therearound from fraying or unraveling.

The strips 7 may be passed through the slits 13 to enter and be housed within the space S between the outer bag and the lining. The bag will be made of such depth that the eyeglasses may be housed therein and the bag closed, by means of the draw string 9. The depth of the bag may be sufficiently limited to prevent strips 7 from passing entirely into the space S between bag and lining but leaving a tip of the strip projecting up and out of the corresponding slit whereby to permit the ready grasping of the tip when the strip is to be withdrawn from the slot, or the strips may pass completely into space S if desired.

It will be seen that the described construction interposes the lining between the eyeglass lenses and strips 7 whereby scratching of the lenses by said strips is effectually prevented. Any suitable ornamentation may be carried by the strip. The members indicated at 15 may be conventional snap fasteners and the spaces 16 upon the strips may bear imitation jewels indicated at 17.

Further, the lining 10 is preferably made of non-scratching material. Also the lining may be impregnated with silicone or other glass polishing material adapted to impart long lived glass polishing capabilities to the lining so that such portions of the lenses as may come in contact with the lining will be automatically polished in the handling of the case.

While the housing of the strips 7 in a space between the lining and the bag proper, and the impregnating of the lining with a glass polishing substance are features which may be separately employed it will be observed that there is a distinct cooperation between them because there would be little use in continually polishing the lenses if at the same time said lenses were being continuously scratched by being permitted to come in contact with strips 7. The same lining which does the polishing also prevents contact between the strips 7 and the lenses.

It is to be understood that the invention is not limited to the precise construction set forth but that it includes within its purview whatever changes fairly fall within either the terms or the spirit of the appended claims.

I claim:

1. A case for eyeglasses of the type comprising the conventional bridge and temple portions and also a separable tiara forming strip of arcuate formation, said case comprising an outer bag-like body, means for closing the mouth of said bag, a pliable inner lining for the body separated from said body sufficiently to leave a space between the body and bag, said lining being provided with slit portions at the upper end thereof to permit the tiara strips to be inserted into the space between body and lining, the lining lying between the strips and the lenses of the eyeglasses whereby to prevent contact between said strips and lenses.

2. A structure as recited in claim 1 wherein said lining is of a glass polishing nature.

3. A structure as recited in claim 1 wherein said lining carries silicone as a glass polishing and cleaning substance.

References Cited in the file of this patent

UNITED STATES PATENTS

| 2,367,182 | Brown | Jan. 16, 1945 |
| 2,721,691 | Makrauer | Oct. 25, 1955 |

FOREIGN PATENTS

| 500,827 | Great Britain | Feb. 16, 1939 |